US011920482B2

(12) United States Patent
Cribley et al.

(10) Patent No.: US 11,920,482 B2
(45) Date of Patent: Mar. 5, 2024

(54) DEVICE FOR FIXING POSITION OF ADJUSTABLE ROWS OF GUIDE VANES OF TURBOMACHINE

(71) Applicant: General Electric Company, Schenectady, NY (US)

(72) Inventors: Laurie Ann Cribley, Holt, MI (US); Rubi Elizabeth Triana Zorsano, Nuevo Leon (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/155,942

(22) Filed: Jan. 18, 2023

(65) Prior Publication Data

US 2023/0287800 A1 Sep. 14, 2023

Related U.S. Application Data

(60) Provisional application No. 63/318,494, filed on Mar. 10, 2022.

(51) Int. Cl.
*F01D 17/16* (2006.01)

(52) U.S. Cl.
CPC ........ *F01D 17/162* (2013.01); *F05D 2220/30* (2013.01); *F05D 2240/12* (2013.01); *F05D 2260/60* (2013.01)

(58) Field of Classification Search
CPC ...... F01D 17/162; F01D 25/246; F01D 25/28; F01D 25/285; F04D 29/60; F04D 29/601; F05D 2230/60; F05D 2230/64; F05D 2230/68; F05D 2230/72; F05D 2230/80; F05D 2260/02; F05D 2260/30
See application file for complete search history.

(56) References Cited

U.S. PATENT DOCUMENTS 2,393,795 A * 1/1946 Miller .................. F16L 23/003 29/238
3,314,595 A * 4/1967 Burge .................. F04D 29/563 415/160
5,094,435 A * 3/1992 Depperman ....... B23K 37/0536 269/47
5,127,797 A * 7/1992 Carman ................ F04D 29/542 415/209.2

(Continued)

FOREIGN PATENT DOCUMENTS

WO 2014/189568 A2 11/2014

OTHER PUBLICATIONS

Non Final Office Action dated Jun. 1, 2023 for U.S. Appl. No. 18/155,934, filed Jan. 18, 2023; pp. 15.

(Continued)

*Primary Examiner* — Topaz L. Elliott
*Assistant Examiner* — Ryan C Clark
(74) *Attorney, Agent, or Firm* — James Pemrick; Charlotte Wilson; Hoffman Warnick LLC

(57) ABSTRACT

A device for fixing the position of adjustable vane rows of a turbomachine is provided. The device includes a support arm and at least one clamping tool. The at least one clamping tool is attached to the support arm. The at least one clamping tool includes a clamping head and a retaining element. The retaining element connects the clamping head to the support arm.

17 Claims, 2 Drawing Sheets

(56) References Cited

U.S. PATENT DOCUMENTS 5,228,181 A * 7/1993 Ingle ........................ B25B 27/16 29/272
5,549,448 A * 8/1996 Langston .............. F01D 17/162 29/889.22
5,560,091 A * 10/1996 Labit, Jr. .................... F16L 1/10 29/272
6,839,979 B1 * 1/2005 Godbole ................ G01B 5/252 33/645
7,244,098 B2 * 7/2007 Bromann .............. F04D 29/563 415/160
10,590,632 B2 3/2020 Parzynski et al.
10,669,882 B2 * 6/2020 Nakayama ............ F01D 17/162
11,015,477 B2 * 5/2021 Lagarde .............. F04D 27/0246
2007/0033795 A1 * 2/2007 McCaffrey .............. B66C 11/12 29/559
2014/0072422 A1 * 3/2014 Huber ...................... F04D 19/02 29/889.21
2014/0093362 A1 * 4/2014 Pickens .................... F01D 25/24 702/170
2015/0337685 A1 * 11/2015 Golubic .................. F01D 25/24 415/214.1
2015/0337986 A1 * 11/2015 Bouchard ............... B25B 5/147 29/244
2017/0191381 A1 * 7/2017 Baba ........................ F01D 25/28
2017/0204745 A1 * 7/2017 Lochner ................ F01D 25/246
2017/0268375 A1 * 9/2017 Osborne ............... F01D 17/162
2017/0321563 A1 * 11/2017 LeBlanc ................. F01D 25/28
2018/0283214 A1 * 10/2018 Kolvick .................... B25B 5/14
2019/0063245 A1 * 2/2019 Wojciechowski .... F01D 17/162
2019/0101012 A1 * 4/2019 Kolvick .................... B25B 5/16
2019/0383163 A1 12/2019 Hernandez et al.
2020/0109640 A1 * 4/2020 Dohse ................... F04D 29/563
2021/0025286 A1 * 1/2021 Fassett ....................... F01D 9/04
2021/0140331 A1 * 5/2021 Little .................... F01D 17/162

OTHER PUBLICATIONS

Final Office Action dated Dec. 18, 2023 for U.S. Appl. No. 18/155,934, filed Jan. 18, 2023; pp. 15.

* cited by examiner

DEVICE FOR FIXING POSITION OF ADJUSTABLE ROWS OF GUIDE VANES OF TURBOMACHINE

This application claims priority to U.S. Provisional Patent Application No. 63/318,494, filed Mar. 10, 2022.

TECHNICAL FIELD

The present disclosure relates to a device for fixing the position of adjustable rows of guide vanes of a turbomachine.

BACKGROUND

When working on open turbomachines, such as compressors, the need may arise to fix the position of rows of variable guide vanes. In numerous applications, the adjustable guide vanes of a row of adjustable guide vanes are connected to each other by a synchronizing ring, which ensures synchronous movement of all guide vanes of a row of adjustable guide vanes. The adjustment of the adjustable guide vanes can then be affected very simply by rotating the synchronizing ring about the axis of the turbomachine. WO 2014/189568 describes a turbomachine with several rows of adjustable guide vanes, each of the rows of adjustable guide vanes being adjusted by means of two synchronizing rings. US 2019/0383163 describes an adjusting mechanism for rows of adjustable guide vanes, wherein the synchronizing rings are self-centering.

BRIEF DESCRIPTION

The subject of the present disclosure is a device for fixing the position of adjustable rows of guide vanes of a turbomachine. According to one aspect, the device is intended to be simple and flexible to use and is intended to be robust to withstand field conditions of use.

Other effects and advantages of the articles described herein, whether explicitly stated or not, arise in light of the present disclosure.

A device for fixing the position of adjustable guide vane rows of a turbomachine is thus described, the device comprising a support arm and at least one clamping tool. The at least one clamping tool can be attached to the support arm at at least one point on the support arm. The clamping tool comprises at least one clamping head and a retaining element, the retaining element being connected to the clamping head and the clamping head being connectable to the support arm by the retaining element. In particular, the support arm has suitable structure for attaching the support arm to a structure that is spatially fixed relative to the stator of the turbomachine.

Using the clamping head, it is possible, for example, to grip the synchronizing ring of a row of adjustable guide vanes—or otherwise an adjusting element provided for adjusting the position of the adjustable guide vanes. The position of the clamping head, in turn, can be fixed via the retaining element of the clamping tool relative to the support arm and thus ultimately relative to the housing of the turbomachine, whereby the position of the entire row of guide vanes or all adjustable guide vanes connected to the synchronizing ring or adjusting element is fixed. Fixing using a clamping head is position-tolerant, such that the synchronizing ring and the clamping head do not have to be in a predefined position relative to each other. It is therefore not necessary, for example, for the clamping head to be at a specific circumferential position relative to the synchronizing ring. It is only necessary for the synchronizing ring to be located between the clamping elements of the clamping head, which means that the entire arrangement has a high positioning tolerance, which saves time and money both in manufacturing and in use.

"One" or "one" are to be understood in the context of the present disclosure as indefinite articles and not as a numeral word, unless another meaning is explicitly indicated, for example, by the use of "exactly one" or "exactly one".

In certain embodiments, the retaining element of the clamping tool has a longitudinal axis and is variably attachable to the support arm along its longitudinal axis, wherein a distance of the clamping head from the support arm is variable due to the variable attachment along the longitudinal axis of the retaining element. Such an embodiment allows great flexibility of use and further allows the support arm to be manufactured with comparatively large dimensional tolerances or not to have to work with high precision when fastening the support arm, which saves time and money in the manufacture as well as in the assembly of the support arm.

For example, the retaining element of the clamping tool can include a threaded rod region and the support arm can have openings through which the threaded rod region can be passed. In this case, the retaining element can be fixed to the support arm by two threaded fasteners, such as nuts, located on the two sides of an opening in the support arm through which the threaded rod region is passed, the position of the fixation being adjustable relative to the longitudinal axis of the threaded rod region or the retaining element.

The clamping head of the clamping tool can comprise two clamping jaws. This arrangement allows a clearance between the two clamping jaws to be adjustable. For this purpose, specific embodiments may provide a region of the retaining element of the clamping tool adjacent to the clamping head as a threaded rod region. In this case, at least one of the clamping jaws is a clamping jaw that is movable relative to the retaining element, and the region of the retaining element that is a threaded rod region and is adjacent to the clamping head is passed through an opening of the movable clamping jaw. Adjacent to the movable clamping jaw and outside the clamping head, a threaded fastener, such as a nut, is screwed onto the region of the retaining element that is a threaded rod region and is located adjacent to the clamping head. By axial adjustment of this threaded fastener (nut) towards the movable clamping jaw, for example, a clamping force can be exerted on a component arranged between the two clamping jaws. In further specific embodiments, it may be provided that one of the clamping jaws is guided displaceable along the retaining element in a clamping direction and the other of the clamping jaws is fixed to the retaining element in the clamping direction.

It may further be provided that a protective pad, such as a neoprene or other protective layer, is arranged on the two opposing inner sides of the clamping jaws. This prevents the application of a clamping force to a component clamped between the clamping jaws from damaging this component.

Furthermore, it can be provided that the clamping tool can be connected to the support arm at a plurality of positions along the longitudinal extension of the support arm. In this way, it is also possible, for example, to fix the guide vanes of several rows of adjustable guide vanes simultaneously using a single fixing device with several clamping tools attached to a single support arm, provided that a turbomachine has several rows of adjustable guide vanes.

The above specific embodiments may be combined with each other. Further, not specifically disclosed embodiments of the teachings of this document are readily apparent to the person skilled in the art.

BRIEF DESCRIPTION OF THE DRAWINGS

The facts set out here are explained in more detail below with reference to selected examples of embodiments shown in the drawing. In detail.

The drawings are highly schematic. Details not necessary for understanding the objects described have been omitted. Further, the drawings show only selected embodiments and should not be relied upon to limit the objects described in the claims. Embodiments not shown may well be covered by the claims.

DETAILED DESCRIPTION

Figure 1:
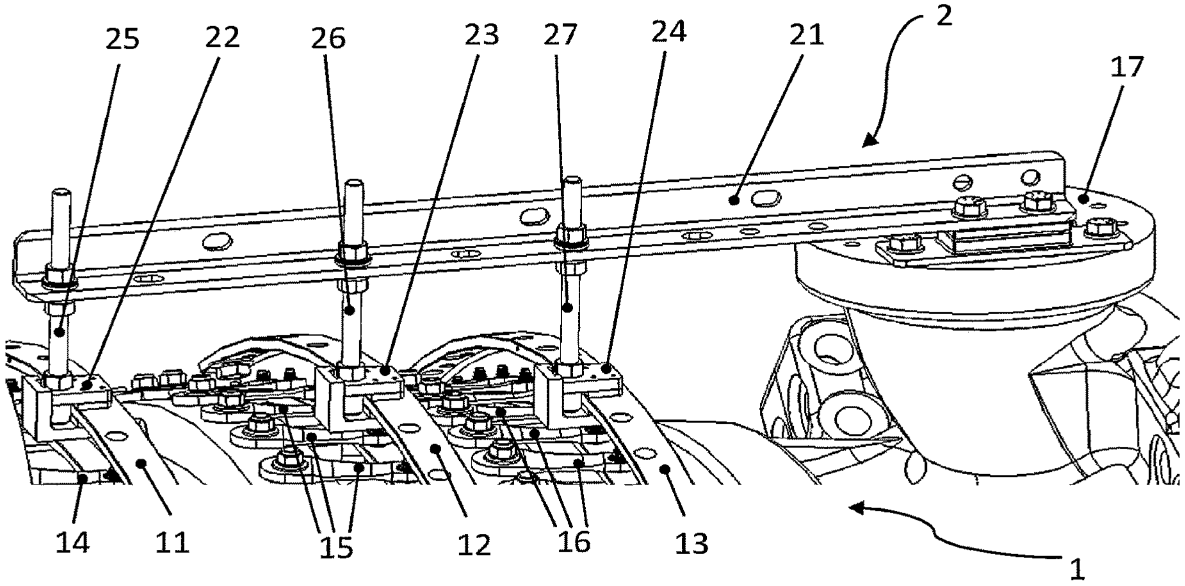
FIG. 1 illustrates a partial view of a turbomachine with three rows of adjustable guide vanes, which are fixed by a device of the type described herein.

FIG. 1 shows an illustrative turbomachine 1 with three rows of adjustable guide vanes. The turbomachine may be, for example, a compressor, a turbine or another system having adjustable guide vanes. The adjustable guide vanes, which are not visible in the FIG., are rotatably mounted in the housing of the turbomachine. As an adjusting mechanism for the adjustable guide vanes, one synchronizing ring 11, 12 or 13 is arranged for each row of adjustable guide vanes. Each synchronizing ring is coupled to the blades of a row of adjustable guide vanes via a number of levers 14, 15 or 16. Each of levers 14, 15, 16 projects from the axis of rotation of an adjustable guide vane and is coupled to the respective synchronizing ring 11, 12 or 13. In this way, a rotational movement of one of the synchronizing rings about the axis of the turbomachine is transmitted to a rotation of the guide vanes coupled to the synchronizing ring about the guide vanes, which are rotatably mounted radially with respect to the turbomachine.

During maintenance or repair work on the turbomachine or a turbomachine or other system to which the turbomachine belongs, it may be necessary to fix the position of the guide vanes in a defined manner. This is accomplished in the present case by a fixing device 2. Fixing device 2 includes a support arm 21 and, for example, three clamping tools, one clamping tool for each of synchronizing rings 11, 12, 13. The clamping tool(s) are coupled to support arm 21 at at least one location on support arm 21. The clamping tool(s) are selectively coupled to support arm 21 at a plurality of positions along a longitudinal extent of support arm 21. Each of the clamping tools includes a clamping head 22, 23, 24, which is connected to support arm 21 or fixed to support arm 21 via a respective retaining element 25, 26, 27. That is, a retaining element 25, 26, 27 couples clamping head 23, 23, 24 to support arm 21. A distance between support arm 21 and clamping head 22, 23, 24 of the at least one clamping tool is adjustable.

Each clamping head 22, 23, 24 is configured to grasp a synchronizing ring of a selected vane row of turbomachine 1. Support arm 21 may extend from and be coupled to a housing 17 of turbomachine 1. Support arm 21 may be cantilevered from the housing to provide support for the clamping tools over synchronizing rings 11, 12, 13. Hence, support arm 21 may alternatively be described as an extension arm, a cantilevered arm, or a boom arm. Other arrangements of coupling support arm 21 to housing 17 of turbomachine 1 may also be possible. Each of clamping heads 22, 23, 24 grasps, e.g., grips and clamps, one of synchronizing rings 11, 12, 13 in the present embodiment. In this way, synchronizing rings 11, 12, 13 are also fixed relative to support arm 21 via clamping heads 22, 23, 24 and retaining elements 25, 26, 27. In turn, support arm 21 is fixed relative to, e.g., fastened, screwed or bolted, to housing 17 (flange of) turbomachine 1 via a suitable retainer and is thus fixed relative to the housing of the turbomachine. Thus, synchronizing rings 11, 12, 13 are also fixed relative to housing 17 of turbomachine 1, which also prevents levers 14, 15, 16 from moving and thus fixes the position of the adjustable guide vanes.

Figure 2:
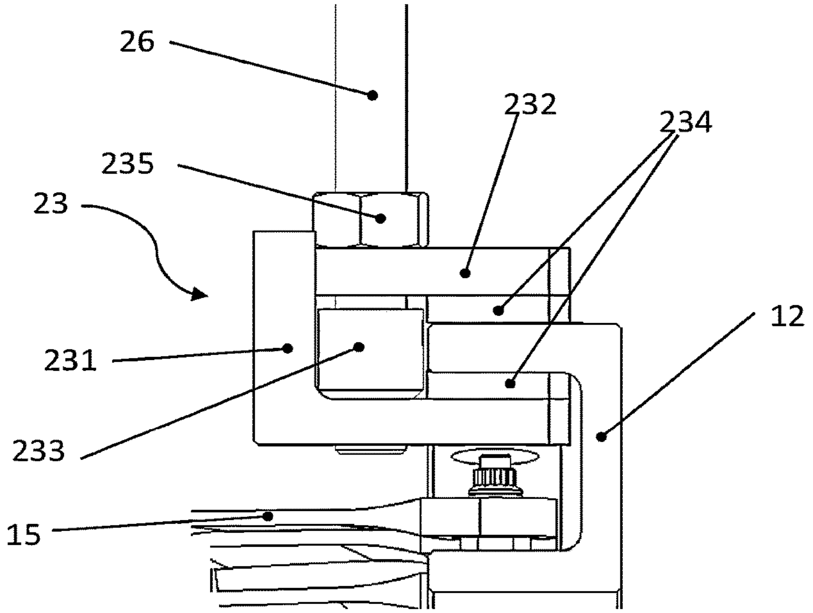
FIG. 2 illustrates a synchronizing ring for adjusting guide vanes, which is clamped in a clamping head of a device of the type described herein.

FIG. 2 shows clamping head 23 for fixing synchronizing ring 12 in an enlarged view. Clamping head 23 includes two clamping jaws 231 and 232. Clamping jaw 231 is fixed in the direction of the longitudinal axis of retaining element 26 relative to retaining element 26. In contrast, clamping jaw 232 is guided for displacement in the direction of the longitudinal axis of retaining element 26. By sliding displaceable clamping jaw 232 toward fixed clamping jaw 231 along the longitudinal axis of retaining element 26, an object disposed between clamping jaws 231 and 232 can be grasped (gripped and clamped) by applying a force directed toward displaceable clamping jaw 232 to fixed clamping jaw 231. The direction along which clamping jaws 231, 232 are moved toward each other or away from each other is referred to as the clamping direction in the context of the present disclosure. In the specific embodiment, this clamping direction is identical to the longitudinal axis of retaining element 26. Adjacent to clamping head 23, retaining element 26 is designed at least partially as a threaded rod, i.e., with one or more threaded rod regions. That is, retaining element 26 includes a threaded rod region adjacent to clamping head 23. Displaceable clamping jaw 232 includes an opening through which the adjacent threaded rod region extends. Adjacent to displaceable clamping jaw 232, a threaded fastener (e.g., nut) 235 is mounted onto retaining element 26, which as noted, is designed as a threaded rod region at least in this region. That is, threaded fastener (e.g., nut) threadedly engages on the threaded rod region of retaining element 26 adjacent to the clamping head 23 and is adjustable to move displaceable clamping jaw 232 to clamp synchronizing ring 12 against the other, fixed clamping jaw 231.

By tightening threaded fastener 235 (nut), the fastener moves along the clamping direction or, in the present embodiment example, along the longitudinal axis of retaining element 26 towards clamping jaws 231, 232. In this manner, a clamping force can be applied between clamping jaws 231, 232, by which synchronizing ring 12 is clamped or frictionally held in clamping head 23. On each of clamping jaws 231, 232, a protective pad 234, for example a neoprene or other protective layer, is arranged on the opposing inner sides of the clamping jaws. In this way, damage to synchronizing ring 12 by clamping jaws 231, 232 and/or seizure of synchronizing ring 12 in clamping head 23 is avoided. A protective sleeve 233, e.g., of bronze or other protective material, may be disposed around retaining element 26 between clamping jaws 231, 232.

Figure 3:
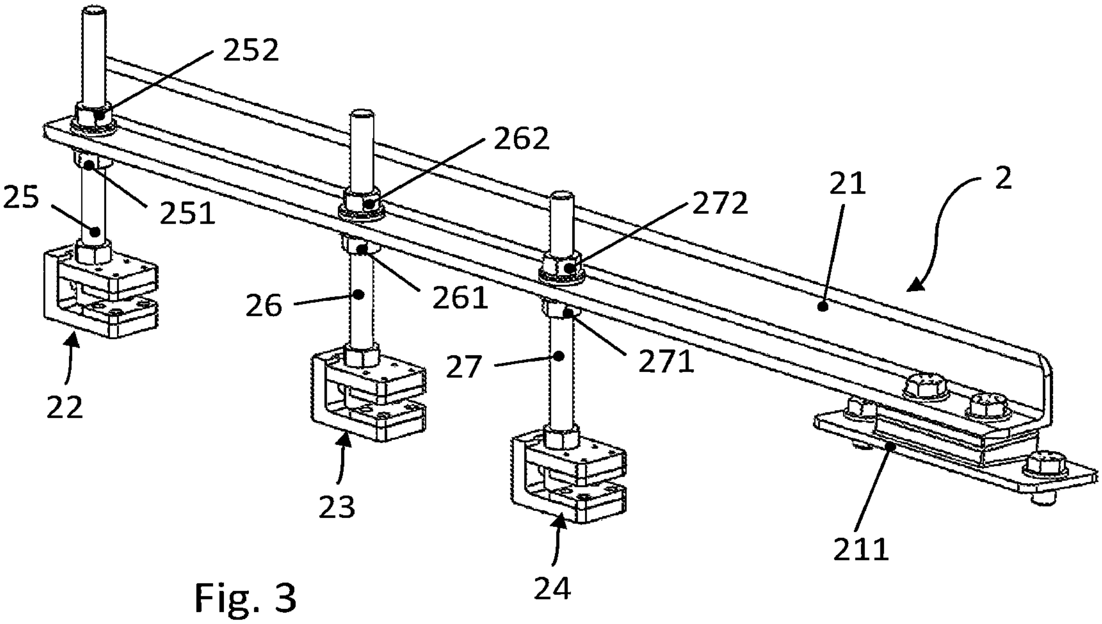
FIG. 3 illustrates a device of the type described above with three clamping tools attached to a support arm.

FIG. 3 shows the fixing device without a turbomachine. Clamping heads 22, 23 and 24 are connected to support arm 21 by means of retaining elements 25, 26 and 27, as already explained above. This connection is made by passing retaining elements 25, 26 and 27, each of which are structured as threaded rod at at least certain regions thereof, through corresponding openings in one leg of support arm 21, which may be structured as an angled bar section, and fixing them to the support arm. To fix retaining elements—or the clamping tools—to support arm 21, pairs of threaded fasteners (e.g., nuts) 251 and 252, 261 and 262, and 271 and 272 are screwed onto retaining elements 25, 26, 27, which are structured as threaded rods in at least that region. By countering the pairs of threaded fasteners, the fasteners clamp support arm 21 and thus fix retaining elements 25, 26, 27 or the clamping tools to support arm 21. That is, support arm 21 has an opening through with the threaded rod region passes and is secured to support arm 21 using the threaded fasteners. As is readily apparent to those skilled in the art, the position of the pairs of threaded fasteners can be varied along the axis of the retaining elements. In this way, the distance of a clamping head 23 from support arm 21 can be variably adjusted as required. A mounting plate 211 may be bolted to a proximal end of support arm 21, allowing the support arm to be attached to housing 17 of turbomachine 1, as shown in FIG. 1.

Figure 4:
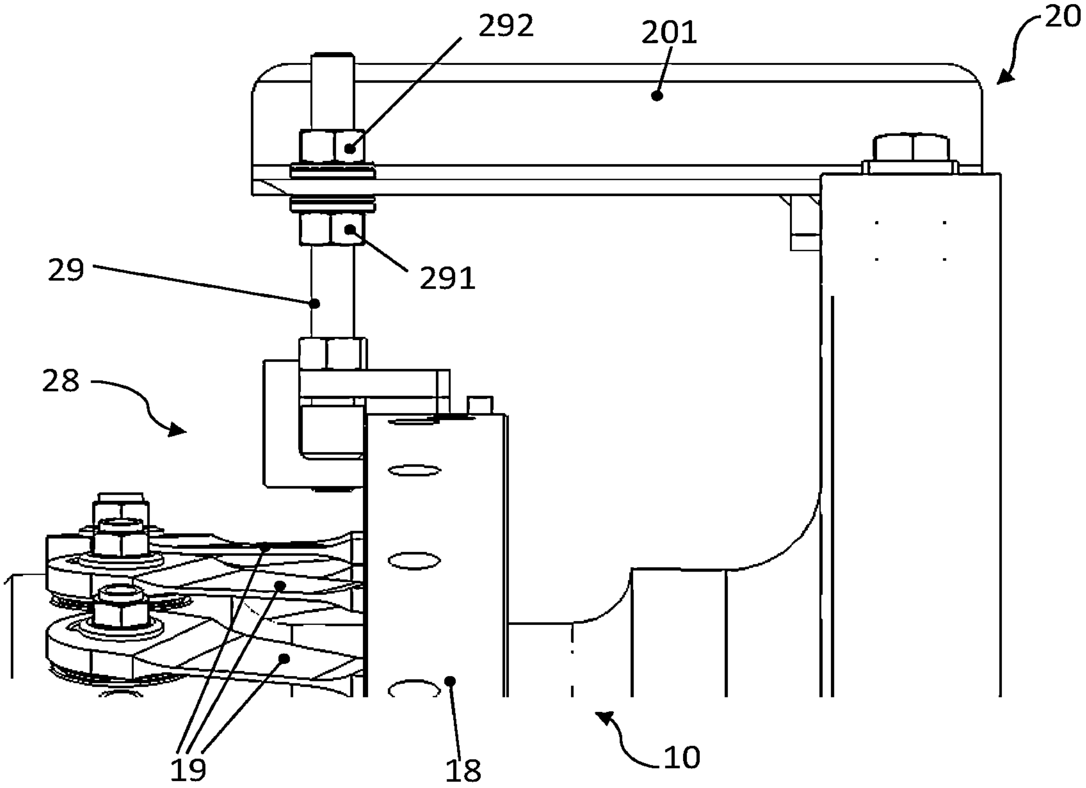
FIG. 4 illustrates a partial view of a turbomachine with a single row of adjustable guide vanes fixed by a device of the type described here.

FIG. 4 illustrates the application of a fixing device 20 of the proposed type to an inlet housing for a turbomachine 10 with a single row of adjustable guide vanes. As explained in the embodiment example of FIG. 1, also in the present case, a synchronizing ring 18 is connected to the adjustable guide vanes via levers 19. A support arm 201 is fixed (e.g., bolted) to the housing of turbomachine 10 and projects toward synchronizing ring 18. A clamping tool is attached to support arm 201, which includes retaining element 29 and clamping head 28. The clamping tool is basically identical to the clamping tool explained in more detail in connection with the FIGS. 1-3. Retaining element 29, and thus the entire clamping tool, is fixed to support arm 201 via the countered threaded fasteners (nuts) 291 and 292, whereby, as also described above, the distance of clamping head 28 from support arm 21 can be variably adjusted.

In contrast to fixing devices in which, for example, pins or rods are inserted into bores of a synchronizing ring to block it, the fixing device proposed here allows large positional tolerances between the synchronizing ring and the support arm as well as between the synchronizing ring and the clamping head, along the longitudinal extension of the support arm as well as transversely to its longitudinal extension. The manufacture of the individual components of the fixing device and the fastening of the fixing device relative to the housing of the turbomachine therefore do not require high precision, and the adjustment of the position of the clamping head as well as the clamping process itself can be performed very easily with the aid of standard tools. These features save time and money in the provision of the fixing device and in its use, while reliable fixing of the position of adjustable guide vanes is made possible.

Although the subject matter of the present disclosure has been explained with reference to selected examples of embodiments, these are not intended to serve as a limitation of the claimed invention. The claims include embodiments that are not explicitly shown, and embodiments that differ from the examples shown are nevertheless covered by the claims.

The invention claimed is:

1. A device for fixing a position of adjustable guide vanes in a vane row of a turbomachine, the device comprising:

a support arm configured to be fixed relative to a housing of the turbomachine; and at least one clamping tool coupled to the support arm at at least one location on the support arm, the at least one clamping tool including:

a clamping head configured to grasp a synchronizing ring of a selected vane row of the turbomachine, the clamping head including two clamping jaws; and a retaining element coupling the clamping head to the support arm, wherein at least one of the clamping jaws is moveable relative to the retaining element.

2. The device according to claim 1, wherein the retaining element of the clamping tool has a longitudinal axis and is variably attachable along the longitudinal axis thereof to the support arm, wherein a distance of the clamping head from the support arm is variable by the variable attachment along the longitudinal axis of the retaining element.

3. The device according to claim 2, wherein the retaining element includes a threaded rod region, and the support arm has an opening through which the threaded rod region passes and is secured to the support arm using threaded fasteners.

4. The device according to claim 1, wherein the retaining element includes:

a threaded rod region adjacent to the clamping head, wherein at least one of the clamping jaws is a displaceable clamping jaw including an opening through which the threaded rod region extends, and a threaded fastener threadedly engaged on the threaded rod region of the retaining element adjacent to the clamping head and adjustable to move the displaceable clamping jaw to clamp the synchronizing ring against the other clamping jaw.

5. The device according to claim 1, wherein one of the clamping jaws is guided along the retaining element in a clamping direction and the other of the clamping jaws is fixed to the retaining element.

6. The device according to claim 1, further comprising a protective pad on opposing inner sides of the clamping jaws.

7. The device according to claim 1, further comprising a protective sleeve disposed around the retaining element between the clamping jaws.

8. The device according to claim 1, wherein the at least one clamping tool is selectively coupled to the support arm at a plurality of positions along a longitudinal extent of the support arm.

9. The device according to claim 1, wherein a distance between the support arm and the clamping head of the at least one clamping tool is adjustable.

10. A device for fixing a position of adjustable guide vanes in a vane row of a turbomachine, the device comprising: a support arm configured to be fixed relative to a housing of the turbomachine; at least one clamping tool coupled to the support arm at at least one location on the support arm, the at least one clamping tool including: a clamping head configured to grasp a synchronizing ring of a selected vane row of the turbomachine, wherein the clamping head of the clamping tool includes two clamping jaws; and a retaining element coupling the clamping head to the support arm; and a protective sleeve disposed around the retaining element between the clamping jaws.

11. The device according to claim 10, wherein the retaining element of the clamping tool has a longitudinal axis and is variably attachable along the longitudinal axis thereof to the support arm, wherein a distance of the clamping head from the support arm is variable by the variable attachment along the longitudinal axis of the retaining element.

12. The device according to claim 11, wherein the retaining element includes a threaded rod region, and the support arm has an opening through which the threaded rod region passes and is secured to the support arm using threaded fasteners.

13. The device according to claim 10, wherein the retaining element includes: a threaded rod region adjacent to the clamping head, wherein at least one of the clamping jaws is a displaceable clamping jaw including an opening through which the threaded rod region extends, and a threaded fastener threadedly engaged on the threaded rod region of the retaining element adjacent to the clamping head and adjustable to move the displaceable clamping jaw to clamp the synchronizing ring against the other clamping jaw.

14. The device according to claim 10, wherein one of the clamping jaws is guided along the retaining element in a clamping direction and the other of the clamping jaws is fixed to the retaining element.

15. The device according to claim 10, further comprising a protective pad on opposing inner sides of the clamping jaws.

16. The device according to claim 10, wherein the at least one clamping tool is selectively coupled to the support arm at a plurality of positions along a longitudinal extent of the support arm.

17. The device according to claim 10, wherein a distance between the support arm and the clamping head of the at least one clamping tool is adjustable.

* * * * *